Sept. 18, 1962 D. E. BRASURE 3,054,703
LAMINATED STRUCTURES AND PROCESS
Filed May 8, 1957
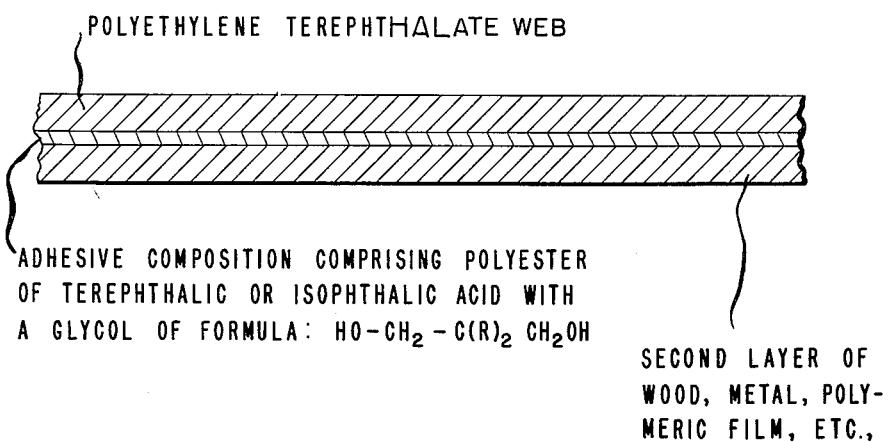
POLYETHYLENE TEREPHTHALATE WEB
ADHESIVE COMPOSITION COMPRISING POLYESTER
OF TEREPHTHALIC OR ISOPHTHALIC ACID WITH
A GLYCOL OF FORMULA: $HO-CH_2-C(R)_2 CH_2OH$
SECOND LAYER OF
WOOD, METAL, POLY-
MERIC FILM, ETC.,
INVENTOR
DONALD E. BRASURE
BY
ATTORNEY 3,054,703
LAMINATED STRUCTURES AND PROCESS
Donald Eugene Brasure, Tonawanda, N.Y., assignor to
E. I. du Pont de Nemours and Company, Wilmington,
Del., a corporation of Delaware
Filed May 8, 1957, Ser. No. 657,948
12 Claims. (Cl. 154—43)

This invention relates to laminated structures and more particularly to laminated structures comprising a web of a linear polyester of terephthalic acid and a glycol, e.g., polyethylene terephthalate film, adhered to a second layer thru the agency of a novel adhesive composition. This invention further relates to such adhesive as a new composition of matter.

Films of linear polymeric esters of terephthalic acid and a glycol, polyethylene terephthalate films in particular, which have been oriented by stretching and/or drawing in both directions to substantially the same extent, are highly versatile materials because of their balanced physical properties, excellent electrical properties, and outstanding resistance to chemical degradation. Such films may be employed as a dielectric in a wide variety of electrical applications, e.g., insulation in motors, transformers, wires and cables, and capacitors, etc. Furthermore, the film is highly useful for such applications as sound recording tape, as a plastic glazing material, as a protective covering for thermal insulation, sound insulation, etc., as a material of construction for transparent containers, piping, bottle closures, and as a versatile packaging material.

Although polyethylene terephthalate film may be employed as the sole structural material in a great variety of end uses, its potential usefulness as a structural material in laminations to itself and other base materials is of tremendous importance. In laminations to itself and other base materials, the field of end uses for this material is practically unlimited. Other base materials to which polyethylene terephthalate may be laminated to form useful structures include the following types of base materials usually in the form of films, fabrics, sheets and coatings; woven fabrics of natural and/or synthetic fibers, fibrous non-woven structures such as paper (e.g., asphalt paper) and cardboards; metal sheets such as aluminum and steel; blockplate such as tinplate or steel; leather; wood, particularly plywood or composition board; polymers such as polyethylene, polyvinyl chloride, and copolymers thereof (particularly plasticized polymers), polyvinylidene chloride and copolymers thereof; rubber and synthetic rubber; cellular structures such as cellular polystyrene and cellular cellulose acetate; woven and non-woven sheets of glass fibers; masonry structures such as cement blocks or cinder blocks; glass, etc. Heretofore one of the main drawbacks in the use of polyethylene terephthalate films as laminations as listed above, has been the lack of adhesives capable of imparting strong adhesion between the film and the materials to be mounted, high cohesive strength, and excellent color properties.

It is an object of this invention therefore, to provide laminated structures comprised of a web of a synthetic linear polyester of terephthalic acid and a glycol tightly adhered to a second layer. A more specific object is to provide laminated structures comprising polyethylene terephthalate film tightly adhered to a second layer. A further object is to provide a process for laminating a web of a polyester of terephthalic acid and a glycol to a second layer. A still further object is to provide an adhesive composition capable of strongly bonding structures of polyethylene terephthalate, and like linear polyesters, to other materials to form a laminated structure. These and other objects will more clearly appear hereinafter.

The foregoing objects are realized by the present invention which, briefly stated, comprises uniting, with the application of heat and pressure, a layer comprising a web of a linear polyester of terephthalic acid and a glycol of the formula HO—$(CH_2)_n$—OH where $n$ is an integer from 2 to 10 inclusive, such as polyethylene terephthalate film, to a second layer by means of an intermediate layer of an adhesive composition comprising essentially a material selected from the group consisting of (a) polyesters prepared by the condensation of a dicarboxylic acid selected from the group consisting of terephthalic and isophthalic acids with a glycol of the formula

HO—$CH_2$—$C(R)_2$—$CH_2$—OH where R is an alkyl group having from 1 to 4 carbon atoms, and (b) copolyesters prepared by the condensation of the polyester prepared as in (a) with the polyester prepared by reacting a glycol of the series HO—$(CH_2)_n$—OH where $n$ is an integer from 2 to 10 inclusive, with a dicarboxylic acid selected from the group consisting of isophthalic and terephthalic acids.

The expression "web of a linear polyester of terephthalic acid and a glycol" refers to films and woven and non-woven fabrics of the subject polyesters.

The term "second layer" is meant to include materials which are usually in the form of sheets, thin films, and woven and non-woven fabrics including plywood, metals, glass, thermosetting and thermoplastic polymers including polyethylene terephthalate itself, wood, paper, leather, etc.

The preferred subject for treatment in accordance with the process of this invention is polyethylene terephthalate as described and claimed in U.S.P. 2,465,319 to Whinfield and Dickson. The polyethylene terephthalate may be prepared by the condensation of ethylene glycol and terephthalic acid or preferably by carrying out an ester interchange reaction between ethylene glycol and a dialkyl ester of terephthalic acid, e.g., dimethyl terephthalate. Films and filaments of polyethylene terephthalate may be prepared by extruding the molten polymer through a narrow orifice and chilling the polymer in film or filament form.

It is to be understood, however, that the present invention comprehends webs of any synthetic linear terephthalic ester polymer derived by reacting a glycol selected from the series HO—$(CH_2)_n$—OH where $n$ is an integer of from 2 to 10, inclusive, terephthalic acid or ester-forming derivatives thereof or a low molecular weight alkyl ester thereof, and from 0 to 20% by weight of the second acid or ester thereof; said second acid being selected from such acids as isophthalic acids, bibenzoic acids, hexahydro terephthalic acid, adipic acid, sebacic acid, azelaic acid, naphthalic acid, 2,5-dimethyl-terephthalic acid, and bis-p-carboxy phenoxy ethane.

As defined hereinbefore, the adhesive layer is a polyester prepared by reacting isophthalic acid or terephthalic acid, preferably a dialkyl ester of these acids, with a glycol of the series HO—$CH_2$—$C(R)_2$—$CH_2$—OH where R is an alkyl radical having from 1 to 4 carbon atoms, or a copolyester prepared by condensing a polyester prepared as described above with a polyester of isophthalic acid or terephthalic acid with a glycol of the series HO—$(CH_2)_n$—OH where $n$ is an integer from 2 to 10 inclusive.

The preferred compositions are polyesters prepared by the ester interchange reactions between a dialkyl ester of terephthalic or isophthalic acids with 2,2-dimethyl-1,3-propanediol (neopentyl glycol) or 2,2-diethyl-1,3-propanediol and copolyesters prepared by condensation of polyesters described above with a polyester prepared by the reaction of a dialkyl ester or terephthalic or isophthalic acid with ethylene glycol.

The polyester or polyester adhesive compositions should have an intrinsic viscosity of at least 0.4. As used herein, intrinsic viscosity, denoted by the symbol $(n)_r$ is a measure of degree as polymerization of a polyester may be defined as:

$$\text{limit of } \frac{\ln (n)_r}{c} \text{ as } c \text{ approaches } 0$$

wherein $(n)_r$ is the viscosity of a dilute phenol-tetrachloroethane (60/40) solution of the polyester divided by the viscosity of the phenol-tetrachloroethane mixture per se measured in the same units at the same temperature and $c$ is the concentration in grams of polyester per hundred cc. of solution.

Polyester adhesive layers in the laminations of the present invention may be applied to the layer of polymeric linear terephthalate ester or to the second layer, or to both from organic solvent solutions of the copolyester which may be applied to the layers by spraying, brushing, dipping or other coating techniques. Normally, it is preferred (although it is not necessary) to drive off the solvent from the adhesive layers so that this layer is in the form of a substantially homogeneous coating upon one or the other or both of the layers to be laminated together. Lamination may then be carried out conveniently in the conventional manner by applying heat and pressure to the composite structure, thereby softening the adhesive layer and producing a strong bond between the layer of polymeric linear terephthalate ester and the second layer. An alternative procedure involves forming preformed homogeneous thin films of the adhesive polyester layer by casting the films upon the surface from which they may be readily stripped, the cast films being poured from solvent solutions of the polyester or from hot melts of the polyester adhesive. After formation and solidification of the polyester adhesive layer in the form of thin films, these films may then be interspersed between polymeric linear terephthalate films or fabrics in the second layer, and the composite may then be laminated together thru the application of heat and pressure sufficient to effect bonding of the contacting surfaces.

It is to be understood that a three layer lamination, illustrated in cross-section in the accompanying drawing, represents a minimum structure and that laminations containing a plurality of polymeric terephthalate structures, e.g., films and fabrics, and a multiplicity of second layers, e.g., metal sheets, glass, paper, wood, etc. are within the scope of this invention.

The following examples will serve to further illustrate the principles and practice of the present invention. Parts and percentages are by weight unless otherwise indicated.

*Example 1*

In a round bottom reaction vessel fitted with a thermometer and fractionating head containing a packed section filled with small Raschig rings was placed 500 parts of dimethyl isophthalate, 540 parts of 2,2-dimethyl-1,3-propanediol (neopentyl glycol), 0.200 parts zinc acetate-dihydrate, and 0.150 part of antimony trioxide. The mixture was warmed rapidly until the pot temperature was 160°–170° C., at which temperature ester interchange began. The mixture was heated until no more methanol distilled over. The mixture was cooled and transferred to a polymerization vessel fitted with a stainless steel stirrer and take-off head, and in thermal contact with a bath of diethylene glycol. The bath was heated to 245° C., and as much of the neopentyl glycol as possible was driven off at atmospheric pressure. Vacuum (0.3 mm.) was then applied, and the mixture was stirred constantly during the polymerization. The course of the polymerization was followed with the aid of a torque meter (a calibrated spring which serves as a coupling between the stirring motor drive shaft and the stirrers). The torque meter reached a maximum reading of 18 after 24 hours; this gave a polymer with an intrinsic viscosity of 0.62. The polymer was chipped and dissolved in methylethylketone (40% solids). This solution was used to prepare laminations of polyethylene terephthalate to polyethylene terephthalate, to plywood, and to aluminum. These laminations had good strength (3–4 lbs. per inch— Suter peel test [1]) and excellent appearance.

*Example 2*

In a round bottom reaction vessel fitted with a thermometer and a fractionating head, was placed 144 parts ethylene glycol, 150 parts dimethyl terephthalate, 0.050 part zinc acetate-dihydrate, and 0.0450 part of antimony trioxide. The mixture was heated to 120° C. whereupon methanol again distilled over. After the theoretical amount of methanol had been removed, the mixture was cooled and placed in the polymerization vessel.

In a similar reaction vessel was placed 350 parts of dimethyl terephthalate, 715 parts of 2,2-dimethyl-1,3-propanediol, 0.140 part of zinc acetate dihydrate, and 0.105 part antimony trioxide. The ester interchange reaction was run in a similar manner as described above. This mixture was then poured into the same polymerization flask as the mixture described above.

The polymerization flask was heated to 245° C., and as much neopentyl and ethylene glycols as possible were driven off at atmospheric pressure. Vacuum (0.3 millimeters) was then applied, and the mixture was stirred constantly during the polymerization. The torque as measured by a torque meter, reached a maximum reading of 53 after 8 hours; this gave a polymer with an intrinsic viscosity of 0.67. Laminations of polyethylene terephthalate film to itself and to wood, aluminum, paper, etc., prepared with this copolymer as the adhesive were of good strength and appearance.

*Example 3*

Into a round bottom reaction vessel fitted with a thermometer and a fractionating head, was placed 97 parts of dimethyl terephthalate, 156 grams of 2,2-dimethyl-1,3-propanediol (neopentyl glycol) and 0.0388 gram of zinc acetatedihydrate. The mixture was heated to 180° C. whereupon methanol began distilling over. Heating was continued until no more methanol was evolved. The mixture was cooled and transferred to a polymerization flask which was fitted with a stainless steel stirrer and take-off head and in thermal contact with a bath of diethylene glycol. The bath was heated to 245° C., and neopentyl glycol removed under a vacuum of 0.5 millimeter. The mixture, obtained after 24 hours, had an intrinsic viscosity of 0.67 and a stick temperature of 122° C.[2] A solution of the polymer in chloroform gave laminations of polyethylene terephthalate film to plywood and to aluminum which were strong (5 lbs. per inch, Suter peel) and had an excellent appearance.

*Example 4*

Separate ester interchange reactions between dimethyl terephthalate and ethylene glycol and between dimethyl isophthalate and neopentyl glycol were run according to the procedure of Example 3. The two monomers were then mixed, and copolymerization was carried out according to the procedure above. The copolymer, having an intrinsic viscosity of 1.00 and a stick temperature of 117° C., was dissolved in toluene (20% solids) and used to prepare polyethylene terephthalate-plywood and polyethylene terephthalate-aluminum laminations. Clear bonds with Suter peel strengths of 3 to 4 lbs. per inch were obtained.

---

[1] Suter peel test: Peel strengths were measured in a conventional Suter tester. This apparatus and the method for testing may be found described in USP 2,147,180—Ubben— Du Pont.

[2] Stick temperature: The minimum temperature at which a sample of the polymer leaves a wet molten trail as it is stroked with moderate pressure across the smooth surface of a heated block of brass.

Example 5

Separate ester interchange reactions between dimethyl terephthalate and ethylene glycol and between dimethyl terephthalate and 2,2-diethyl, 1,3-propanediol were run according to the procedure set forth in Example 3. Copolymerization of the two monomers, 7.0 parts of bis-2,2-hydroxy-ethyl terephthalate and 10.0 parts of bis-(3,3-hydroxy-2,2,2',2'-diethyl propanediol) terephthalate, yielded a copolymer with an intrinsic viscosity of 0.65 and stick temperature of 106° C. A 15% solution of methylethylketone was used to prepare clear laminations of polyethylene terephthalate to plywood and polyethylene terephthalate to aluminum having Suter peel strengths of 3 lbs. per inch.

Example 6

Ester interchange and polymerization reactions were run according to the procedure of Example 3, utilizing dimethyl terephthalate and 2,2-diethyl, 1,3-propanediol as the reactants. A 30% solution of the polymer and methylethylketone gave polyethylene terephthalate to plywood and polyethylene terephthalate to aluminum laminations of excellent clarity and Suter peel strengths of 3 lbs. per inch.

The adhesive compositions prepared by the process of the present invention are highly effective for laminating polyethylene terephthalate film and like structures not only to itself, but to other materials such as plywood, aluminum, paper, etc. Such compositions lay open a wide variety of end uses for polyethylene terephthalate film and like web structures heretofore not possible because of a lack of suitable adhesives. The laminations prepared by the process possess exceptionally strong adhesion between the polyester web and materials bonded to it.

I claim:

1. A process which comprises uniting, with the application of heat and pressure, a layer comprising a web of a polyester of terephthalic acid and a glycol of the formula $HO-(CH_2)_n-OH$ where $n$ is an integer from 2 to 10 inclusive, to a second layer by means of an intermediate layer comprising essentially a material selected from the group consisting of (a) polyesters prepared by the condensation of a dicarboxylic acid selected from the group consisting of terephthalic and isophthalic acids with a glycol of the formula $HO-CH_2-C(R)_2-CH_2-OH$, where R is an alkyl group having from 1 to 4 carbon atoms, and (b) copolyesters prepared by the condensation of the polyester prepared as in (a) with the polyester prepared by reacting a glycol of the series $HO-(CH_2)_n-OH$ where $n$ is an integer from 2 to 10 inclusive, with a dicarboxylic acid selected from the group consisting of isophthalic and terephthalic acids.

2. A process which comprises uniting, with the application of heat and pressure, a film of polyethylene terephthalate to a second layer by means of an intermediate layer comprising essentially a material selected from the group consisting of (a) polyesters prepared by the condensation of a dicarboxylic acid selected from the group consisting of terephthalic and isophthalic acids with a glycol of the formula $HO-CH_2-C(R)_2-CH_2-OH$, where R is an alkyl group having from 1 to 4 carbon atoms, and (b) copolyesters prepared by the condensation of the polyester prepared as in (a) with the polyester prepared by reacting a glycol of the series $HO-(CH_2)_n-OH$ where $n$ is an integer from 2 to 10 inclusive, with a dicarboxylic acid selected from the group consisting of isophthalic and terephthalic acids.

3. The process of claim 2 wherein the glycol of the formula $HO-CH_2-C(R)_2-CH_2-OH$ is neopentyl glycol.

4. A process which comprises uniting, with the application of heat and pressure, a film of polyethylene terephthalate to a second film of polyethylene terephthalate by means of an intermediate layer comprising essentially a material selected from the group consisting of (a) polyesters prepared by the condensation of a dicarboxylic acid selected from the group consisting of terephthalic and isophthalic acids with a glycol of the formula $HO-CH_2-C(R)_2-CH_2-OH$, where R is an alkyl group having from 1 to 4 carbon atoms, and (b) copolyesters prepared by the condensation of the polyester prepared as in (a) with the polyester prepared by reacting a glycol of the series $HO-(CH_2)_n-OH$ where $n$ is an integer from 2 to 10 inclusive, with a dicarboxylic acid selected from the group consisting of isophthalic and terephthalic acids.

5. A process which comprises uniting, with the application of heat and pressure, a film of polyethylene terephthalate to a layer of wood by means of an intermediate layer comprising essentially a material selected from the group consisting of (a) polyesters prepared by the condensation of a dicarboxylic acid selected from the group consisting of terephthalic and isophthalic acids with a glycol of the formula $HO-CH_2-C(R)_2-CH_2-OH$, where R is an alkyl group having from 1 to 4 carbon atoms, and (b) copolyesters prepared by the condensation of the polyester prepared as in (a) with the polyester prepared by reacting a glycol of the series $HO-(CH_2)_n-OH$ where $n$ is an integer from 2 to 10 inclusive, with a dicarboxylic acid selected from the group consisting of isophthalic and terephthalic acids.

6. A process which comprises uniting, with the application of heat and pressure, a film of polyethylene terephthalate to a layer of aluminum by means of an intermediate layer comprising essentially a material selected from the group consisting of (a) polyesters prepared by the condensation of a dicarboxylic acid selected from the group consisting of terephthalic and isophthalic acids with a glycol of the formula $HO-CH_2-C(R)_2-CH_2-OH$, where R is an alkyl group having from 1 to 4 carbon atoms, and (b) copolyesters prepared by the condensation of the polyester prepared as in (a) with the polyester prepared by reacting a glycol of the series $HO-(CH_2)_n-OH$ where $n$ is an integer from 2 to 10 inclusive, with a dicarboxylic acid selected from the group consisting of isophthalic and terephthalic acids.

7. A laminated structure comprising a layer of a web of a polyester of terephthalic acid and a glycol of the formula $HO-(CH_2)_n-OH$ where $n$ is an integer from 2 to 10 inclusive, united to a second layer by means of an intermediate layer of an adhesive composition comprising essentially a material selected from the group consisting of (a) polyesters prepared by the condensation of a dicarboxylic acid selected from the group consisting of terephthalic and isophthalic acids with a glycol of the formula $HO-CH_2-C(R)_2-CH_2-OH$, where R is an alkyl group having from 1 to 4 carbon atoms, and (b) copolyesters prepared by the condensation of the polyester prepared as in (a) with the polyester prepared by reacting a glycol of the series $HO-(CH_2)_n-OH$ where $n$ is an integer from 2 to 10 inclusive, with a dicarboxylic acid selected from the group consisting of isophthalic and terephthalic acids.

8. A laminated structure comprising a layer of a film of polyethylene terephthalate united to a second layer by means of an intermediate layer of an adhesive composition comprising essentially a material selected from the group consisting of (a) polyesters prepared by the condensation of a dicarboxylic acid selected from the group consisting of terephthalic and isophthalic acids with a glycol of the formula $HO-CH_2C(R)_2-CH_2-OH$ where R is an alkyl group having from 1 to 4 carbon atoms, and (b) copolyesters prepared by the condensation of the polyester prepared as in (a) with the polyester prepared by reacting a glycol of the series $$HO—(CH_2)_n—OH$$

where $n$ is an integer from 2 to 10 inclusive, with a dicarboxylic acid selected from the group consisting of isophthalic and terephthalic acids.

9. The laminated structure of claim 8 wherein the glycol of the formula $HO—CH_2—C(R)_2—CH_2—OH$ is neopentyl glycol.

10. The laminated structure of claim 8 wherein said second layer is polyethylene terephthalate film.

11. The laminated structure of claim 8 wherein said second layer is wood.

12. The laminated structure of claim 8 wherein said second layer is aluminum.

References Cited in the file of this patent

UNITED STATES PATENTS

| | | |
|---|---|---|
| 2,650,213 | Hofrichter | Aug. 25, 1953 |
| 2,673,826 | Ness | Mar. 30, 1954 |
| 2,676,128 | Piccard | Apr. 20, 1954 |
| 2,719,100 | Banigan | Sept. 27, 1955 |
| 2,765,250 | Williams | Oct. 2, 1956 |
| 2,765,251 | Williams | Oct. 2, 1956 |
| 2,808,390 | Caldwell | Oct. 1, 1957 |
| 2,809,911 | Richardson | Oct. 15, 1957 |
| 2,813,055 | Nischk et al. | Nov. 12, 1957 |
| 2,819,248 | Casebolt | Jan. 7, 1958 |
| 2,839,492 | Caldwell | June 17, 1958 |
| 2,865,891 | Michel | Dec. 23, 1958 |